Aug. 16, 1966 C. S. WEISNER ET AL 3,266,345

PIPE FACING TOOL

Filed Oct. 1, 1963

INVENTORS
CARL S. WEISNER
THOMAS F. BRUDENELL
BY
ATTORNEYS

United States Patent Office 3,266,345
Patented August 16, 1966

3,266,345
PIPE FACING TOOL
Carl S. Weisner, Pleasant Hill, and Thomas F. Brudenell, Taft, Calif., assignors to Chevron Research Company, a corporation of Delaware
Filed Oct. 1, 1963, Ser. No. 313,083
1 Claim. (Cl. 77—73)

This invention relates to a rotary tool and more particularly a rotary driven cutting tool for facing an end edge of a pipe. The tool has particular application in facing the end edges of tubular plastic pipe to prepare the pipe prior to its being welded to a mating edge of a similar pipe.

Plastic pipe of materials such as polyethylene or polypropylene has recently been introduced as a substitute for metallic fluid piping and for both metallic and fibrous electrical conduit. Plastic pipe of this type is usually extruded as a continuous length of pipe and then cut into sections of a standard dimension. One of the advantages of plastic pipe over metallic or fibrous pipe is the ease with which it may be joined to other sections of plastic pipe. Joints may be completed merely by gluing the end edges together or by heating the end edges and then pressing the edges together. The resultant welded joint frequently becomes stronger than the usual section of the material itself.

The operation of joining sections of plastic pipe encounters a problem when the end edge of one pipe does not mate with the end edge of another pipe to which it is to be joined. Since the end edges are to be joined in a butt joint, they should be perfectly true with each other. The simplest manner for insuring that the end edges will join properly is to assure that all end edges of each section of pipe will be true with respect to the axis of the pipe when the pipe is cut into sections. While squared ends may be insured when the pipe is cut into sections, it is possible that these cut ends may be damaged prior to use of the pipe. With the aid of the tool of the present invention, it is now possible to face the end edge of a length of pipe in a fast, efficient and simple manner. The present invention contemplates the use of a rotary tool to be driven by a conventional electrical drill with a guide member that fits into the interior of the pipe and a rotary cutting member to be guided by the guide to the end edge of the pipe.

The objects and features of the invention will be readily apparent to those skilled in the art from the specification and appended drawings illustrating a preferred embodiment wherein.

Figure 1:
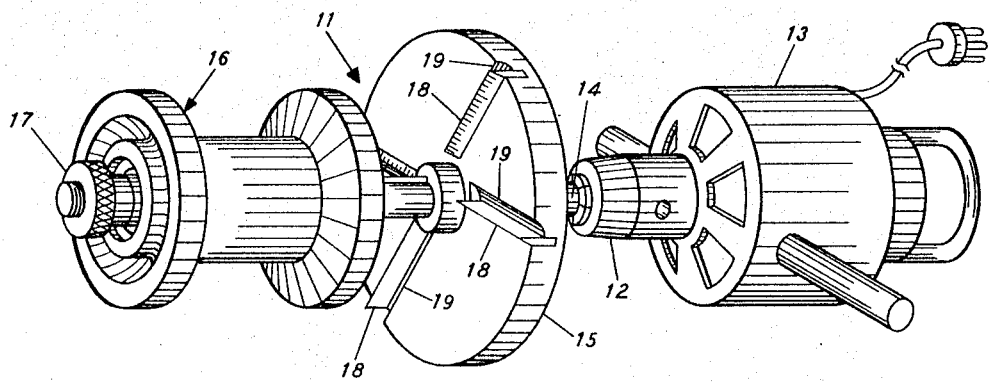
FIGURE 1 is an assembly view, in perspective, illustrating the facing tool mounted in the chuck of an electrical hand drill.

Referring now to FIGURE 1 where the rotary tool of the present invention is illustrated in perspective, it may be seen that the tool 11 is particularly adapted to be mounted in the chuck 12 of a conventional electric drill 13. As illustrated, the tool comprises a shaft 14 to which a cutting member 15 and a guide member 16 are mounted. The cutting member is fixed to the drive shaft to be rotated thereby and the guide member is preferably mounted on suitable bearings so as to provide rotary support for the drive shaft. The guide member is positioned on the drive shaft by a lock nut 17. One face of the cutting member is provided with a plurality of cutting blades 18 each mounted so as to engage the end edge of a pipe to be faced. Chip grooves 19 are cut into the face of the cutting member so as to provide a passageway for materials removed from the end edge of the pipe.

Figure 2:
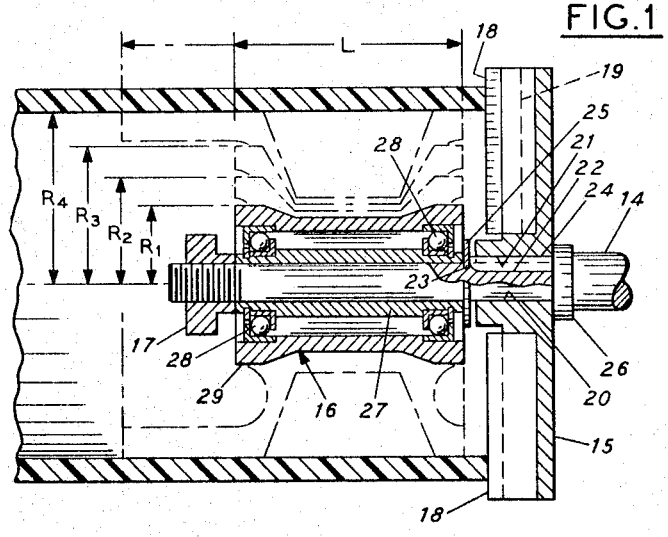
FIGURE 2 is a sectional view of the guide member and cutting member of the facing tool illustrating the use of a single cutting tool with guide members adapted for different sizes of pipe.

FIGURE 2 illustrates a sectional view of the cutting member and the guide member. The cutting member is illustrated as a disk-like member having a central hole 20 and keyway guide 21. The shaft 14 is provided with a longitudinal key-way groove 22 and a lateral spring washer slot 23. The keyway guide 21 and keyway groove 22 accommodate a key 24 to provide a secure driving engagement for the cutting member to the drive shaft while the spring washer slot 23 accommodates a spring washer 25 to position the key within the keyway. The key and spring washer position the cutting member with respect to a shoulder 26 on shaft 14. The cutting member could also be secured to the shaft 14 by a set screw through a shoulder in the member.

Also mounted to the shaft 14 is the guide member 16. As illustrated in FIGURE 2, the guide member may be one of several sizes of guides selected to adapt the cutting member for different sizes of pipe. As illustrated, the guide members may be of radius R1, R2, R3 or R4 so as to be useful for instance, with pipe of 2, 3, 4 and 6 inch diameters. As illustrated, the guide member constitutes a rotating cylindrical axle portion 27 engaging the shaft 14 and providing support for rotary bearings 28 at each end. The actual aligning guide 29 is supported on the bearings 28. The assembled guide member is secured to the shaft by lock nut 17 engaging a threaded end of shaft 14. It may be seen that the rotating member 27 and the bearings 28 may be of one size for all sizes of aligning guides regardless of the radial dimension to the edge of the guide and a single size lock nut 17 may be used to lock all sizes of guides.

Figure 3:
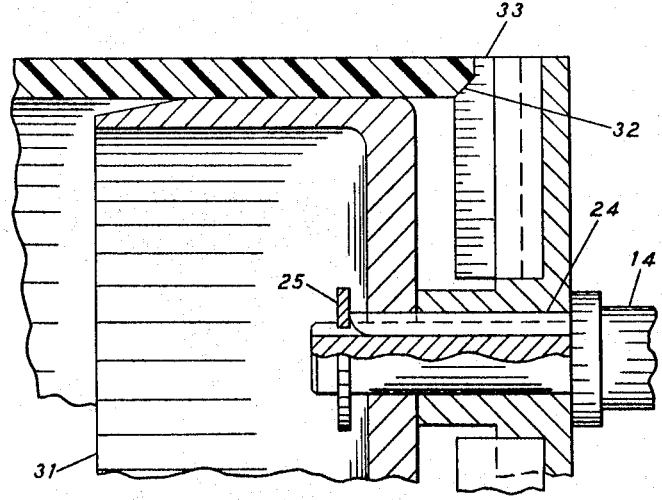
FIGURE 3 is a sectional view illustrating an alternative form for the guide member and the cutting blade as used with the present invention.

An alternative form for the guide member is illustrated in FIGURE 3 as a cup shaped member 31 secured to the shaft 14 by the key 24 and spring lock washer 25. The cup shaped guide member is rotated with the shaft 14 as the tool is operated to face the end of a pipe.

FIGURE 3 also illustrates an alternative form for the cutting blade of the facing tool. In this form the blade 33 is provided with a slanted surface at 32 to form a bevel or chamfer in the interior surface of the end edge of the pipe being faced. The purpose of the chamfer will be hereinafter explained.

The guides illustrated in FIGURES 2 and 3 preferably are dimensioned to provide a minimum ratio between the length of the guide L and the radius of the guide R. It has been found that a ratio of $L/R=2$ is preferred to insure that the cutting member 15 will be aligned perpendicular to the axis of the pipe. For small diameter pipes a single length L that will satisfy the preferred ratio through pipes of about three inch size is illustrated. For larger pipes an elongated aligning guide 29 is illustrated mounted on the same size cylindrical axle 27 as was used for the smaller diameter aligning guides. Thus shaft 14 may still accommodate all sizes of guide members.

Figure 4A:
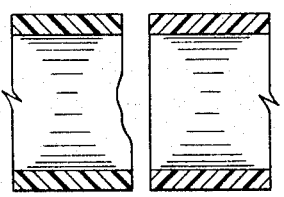
FIGURES 4A, 4B, 4C and 4D illustrate the steps of truing, facing, chamfering and butt welding of a plastic pipe to illustrate the use of the tool of the present invention.
Figure 4B:
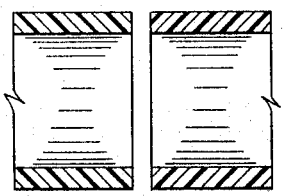
Figure 4C:
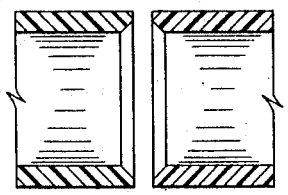
Figure 4D:
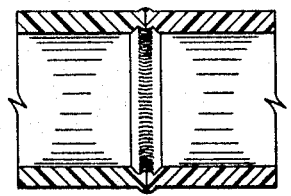

FIGURES 4A–4D illustrate the preparation of a pipe for a butt weld as shown in FIGURE 4D. FIGURE 4A illustrates the frequently untrue or damaged face of a section of pipe. It may be seen that an attempt to join the edge of the right hand pipe to the edge of the left hand pipe of FIGURE 4A could result in a seal only at the bottom of the illustration without an engagement at the top of the pipe. Even if the pipe were true, an irregular dent as is illustrated would probably not fully engage a true edge of a mating pipe. At the right hand portion of FIGURE 4B the pipe is illustrated as having its end edge properly faced for engagement with a faced pipe at the left hand portion of the illustration.

At the right hand end of FIGURE 4C a chamfered face for the end edge of a pipe is shown aligned for engagement with a similarly chamfered end edge at the left hand side of the illustration; the chamfered edges are formed by the alternative cutter 33 as illustrated in FIGURE 3. In FIGURE 4D a completed butt weld is illustrated with the chamfered edges joined and partially filling the chamfered portion of the pipe.

The usual procedure for joining plastic pipe involves heating the end edges that are to be joined. After the edges have been heated to a semiflowable state, the source of heat is removed and the two end edges are pressed against each other. The pressing engagement of these semiflowable end faces causes the pipe to become joined as the heated edges cool. It can be seen by reference to FIGURE 4D that the end edges, if not chamfered, would form a bead on the inside of the pipe at the joined faces much the same as a bead has been formed on the outside surface of the pipe. To eliminate such a bead, the chamfering is provided.

The foregoing description of the elements of the facing tool of the present invention will indicate the method of using the tool. A particular advantage of the present tool is its adaptability to the facing of the end edges of many sizes of pipe. The use of the tool herein illustrated makes it possible to face the edges of sections of pipe as they are stacked prior to their use so that as sections of pipe are brought to the place where they are to be used they will be prepared for being joined to the pipe already in use.

While certain preferred embodiments of the invention have been specifically disclosed, it should be understood that the invention is not limited thereto as many variations will be readily apparent to those skilled in the art and the invention is to be given its broadest possible interpretation within the terms of the following claim.

We claim:

A tool adapted to be supported on and rotated by a hand held power tool for facing the end edge of circular hollow plastic pipe to prepare said pipe to be joined to the end edge of another pipe of the same type and diameter comprising:

(a) a shaft member, (b) a removably supported, cylindrical guide member journaled on said shaft member, said guide member being dimensioned slightly smaller than said pipe to be faced so as to be longitudinally positionable within said pipe, said guide member engaging the inside longitudinal surface of said plastic pipe and being at least as long in longitudinal engagement with said pipe as the outside diameter of said guide member, (c) a disc like cutter support member, said cutter support member being fixed to said shaft member so as to be rotatable thereby and to be movable with respect to the longitudinal axis of said pipe with said shaft, at least one cutting blade adjustably positioned radially of said cutter support member at a face thereof engageable with the end edge of said pipe, said blade including a formed cutting surface adapted to cut an inside chamfer on the inside end edge of said pipe, (d) side shaft member adapted to be driven by the said power tool whereby said guide member may be moved longitudinally within said pipe and said cutting blades may be brought into end edge engagement with said pipe so as to face the end edge of said pipe perpendicular to said shaft and to chamfer the inside end edge of said pipe.

References Cited by the Examiner

UNITED STATES PATENTS

| | | | |
|---|---|---|---|
| 794,989 | 7/1905 | Kohler | 144—205 |
| 2,362,036 | 11/1944 | Tade | 90—12 X |
| 2,470,392 | 5/1949 | Gassmann | 77—73 |
| 2,478,310 | 8/1949 | Payne | 77—2 X |
| 3,088,202 | 5/1963 | Murray | 90—12.5 X |
| 3,115,054 | 12/1963 | Rupe | 82—1 |

WILLIAM W. DYER, Jr., *Primary Examiner.*

FRANCIS S. HUSAR, *Examiner.*